United States Patent
Cherepinsky et al.

(10) Patent No.: US 10,528,063 B2
(45) Date of Patent: Jan. 7, 2020

(54) NATURAL LANGUAGE MISSION PLANNING AND INTERFACE

(71) Applicant: Sikorsky Aircraft Corporaton, Stratford, CT (US)

(72) Inventors: Igor Cherepinsky, Sandy Hook, CT (US); Prateek Sahay, Acton, MA (US); Mark D. Ward, Milford, CT (US); Sacha Duff, Shelton, CT (US); Margaret M. Lampazzi, Oxford, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 0 days.

(21) Appl. No.: 15/863,238

(22) Filed: Jan. 5, 2018

(65) Prior Publication Data

US 2018/0259977 A1    Sep. 13, 2018

Related U.S. Application Data

(60) Provisional application No. 62/468,058, filed on Mar. 7, 2017.

(51) Int. Cl.
| | | |
|---|---|---|
| G05D 1/10 | (2006.01) | |
| B64C 39/02 | (2006.01) | |
| G06F 17/24 | (2006.01) | |
| G06F 3/0482 | (2013.01) | |
| B64C 27/82 | (2006.01) | |

(Continued)

(52) U.S. Cl.
CPC ............ G05D 1/101 (2013.01); B64C 39/02 (2013.01); G06F 17/243 (2013.01); G06F 17/248 (2013.01); B64C 13/503 (2013.01); B64C 27/06 (2013.01); B64C 27/82 (2013.01); B64C 2027/8236 (2013.01); G06F 3/0482 (2013.01)

(58) Field of Classification Search
CPC ...................................................... G05D 1/101
See application file for complete search history.

(56) References Cited

U.S. PATENT DOCUMENTS

| | | | |
|---|---|---|---|
| 5,408,413 A * | 4/1995 | Gonser | G05D 1/0005 244/182 |
| 6,856,864 B1 * | 2/2005 | Gibbs | G01C 23/005 701/14 |

(Continued)

*Primary Examiner* — Alex C Dunn
(74) *Attorney, Agent, or Firm* — Cantor Colburn LLP

(57) ABSTRACT

An example computer-implemented method for natural language mission planning includes: responsive to receiving a request to initiate mission planning for a selected mission type from a plurality of mission types, constructing, by a processing system, a mission narrative that describes a mission intent based on the selected mission type, the mission narrative comprising a plurality of fields; populating, by the processing system, the plurality of fields in the mission narrative from an autonomous mission manager based on the selected mission type with options to be selected by a mission planner; responsive to presenting the populated plurality of fields to the mission planner, filling, by the processing system, the mission narrative with the received selected options; creating, by the processing system, an optimized mission plan based on the mission narrative; and controlling, by the processing system, a vehicle based on the optimized mission plan.

14 Claims, 7 Drawing Sheets

(51) Int. Cl.
*B64C 27/06* (2006.01)
*B64C 13/50* (2006.01)

(56) References Cited

U.S. PATENT DOCUMENTS

| | | | |
|---|---|---|---|
| 7,272,491 B1* | 9/2007 | Berard | G06Q 10/047 |
| | | | 701/14 |
| 9,046,892 B2* | 6/2015 | Jang | G06Q 10/0631 |
| 9,115,995 B1* | 8/2015 | Owen | G01C 23/00 |
| 9,132,913 B1* | 9/2015 | Shapiro | B64C 19/00 |
| 9,573,684 B2* | 2/2017 | Kimchi | B64C 39/024 |
| 10,089,889 B2* | 10/2018 | Patterson | B64C 39/024 |
| 2014/0142785 A1* | 5/2014 | Fuentes | G05D 1/0011 |
| | | | 701/2 |
| 2014/0257598 A1* | 9/2014 | Bailey | G05D 1/101 |
| | | | 701/3 |
| 2014/0279809 A1* | 9/2014 | Hershey | G06N 5/025 |
| | | | 706/47 |
| 2015/0276411 A1* | 10/2015 | Savarit | G01C 21/00 |
| | | | 701/467 |
| 2017/0092135 A1* | 3/2017 | Hardt | G08G 5/0017 |
| 2018/0157996 A1* | 6/2018 | Eijdenberg | G06Q 10/02 |
| 2018/0275654 A1* | 9/2018 | Merz | G01S 13/9303 |

\* cited by examiner

NATURAL LANGUAGE MISSION PLANNING AND INTERFACE

DOMESTIC PRIORITY

This application claims the benefit of U.S. Patent Application No. 62/468,058, which was filed on Mar. 7, 2017, the content of which is incorporated herein by reference in its entirety.

STATEMENT OF FEDERAL SUPPORT

This invention was made with government support under HR0011-15-9-0004 awarded by the Defense Advanced Research Projects Agency (DARPA). The government has certain rights in the invention.

BACKGROUND OF THE INVENTION

The subject matter disclosed herein relates to mission planning and, more particularly, to natural language mission planning.

Vehicles, such as air vehicles, may be used to execute missions, such as medical evacuations, logistical resupplies, refueling, cargo pick-up/drop-off, and the like. To execute these missions, a crew member (e.g., a pilot and/or other crew) or another operator plans the mission, including its individual elements (e.g., take off, waypoints, cargo pick-up/drop-off, landing, etc.).

BRIEF DESCRIPTION OF THE INVENTION

According to an embodiment, a processing system for natural language mission planning includes an autonomous mission management module configured to receive a request to initiate mission planning for a selected mission type from a plurality of mission types. The autonomous mission management module is further configured to construct a mission narrative that describes a mission intent based on the selected mission type, the mission narrative including a plurality of fields. The autonomous mission management module is further configured to populate the plurality of fields in the mission narrative based on the selected mission type with options to be selected by a mission planner. The autonomous mission management module is further configured to filling the mission narrative with the received selected options to create an optimized mission plan responsive to presenting the populated plurality of fields to the mission planner. The processing system further includes a flight control system configured to control a vehicle based on the optimized mission plan.

In addition to one or more of the features described above, or as an alternative, further embodiments include an input device configured to receive the selected mission type and the selected options from the mission controller.

In addition to one or more of the features described above, or as an alternative, further embodiments include a display to display the mission narrative to the mission planner.

In addition to one or more of the features described above, or as an alternative, in further embodiments controlling the vehicle based on the optimized mission plan includes controlling at least one of an altitude, a heading, or a speed.

In addition to one or more of the features described above, or as an alternative, in further embodiments the mission narrative is in sentence form.

In addition to one or more of the features described above, or as an alternative, in further embodiments the vehicle is a rotor wing vehicle or a fixed wing vehicle.

In addition to one or more of the features described above, or as an alternative, in further embodiments the options are populated based on at least one of sensor data, a mission template, and a mission database.

According to an embodiment, a computer-implemented method for natural language mission planning includes, responsive to receiving a request to initiate mission planning for a selected mission type from a plurality of mission types, constructing, by a processing system, a mission narrative that describes a mission intent based on the selected mission type, the mission narrative including a plurality of fields. The method further includes populating, by the processing system, the plurality of fields in the mission narrative from an autonomous mission manager based on the selected mission type with options to be selected by a mission planner. The method further includes, responsive to presenting the populated plurality of fields to the mission planner, filling, by the processing system, the mission narrative with the received selected options. The method further includes creating, by the processing system, an optimized mission plan based on the mission narrative. The method further includes controlling, by the processing system, a vehicle based on the optimized mission plan.

In addition to one or more of the features described above, or as an alternative, in further embodiments the mission narrative is in sentence form.

In addition to one or more of the features described above, or as an alternative, further embodiments include presenting the optimized mission plan to the mission planner and receiving an acceptance from the mission planner prior to controlling the vehicle based on the optimized mission plan.

In addition to one or more of the features described above, or as an alternative, in further embodiments wherein controlling the vehicle based on the optimized mission plan includes controlling at least one of an altitude, a heading, or a speed.

In addition to one or more of the features described above, or as an alternative, in further embodiments the plurality of mission types includes a medical evacuation mission, a logistical resupply mission, a refueling mission, and a cargo mission.

In addition to one or more of the features described above, or as an alternative, further embodiments include presenting, by the processing system, the optimized mission plan in narrative form to the mission planner on a display.

In addition to one or more of the features described above, or as an alternative, further embodiments include receiving, by the processing system, a request to edit the optimized mission plan.

In addition to one or more of the features described above, or as an alternative, in further embodiment include controlling, by the processing system, the vehicle based on the received request to edit the optimized mission plan.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

Figure 1:
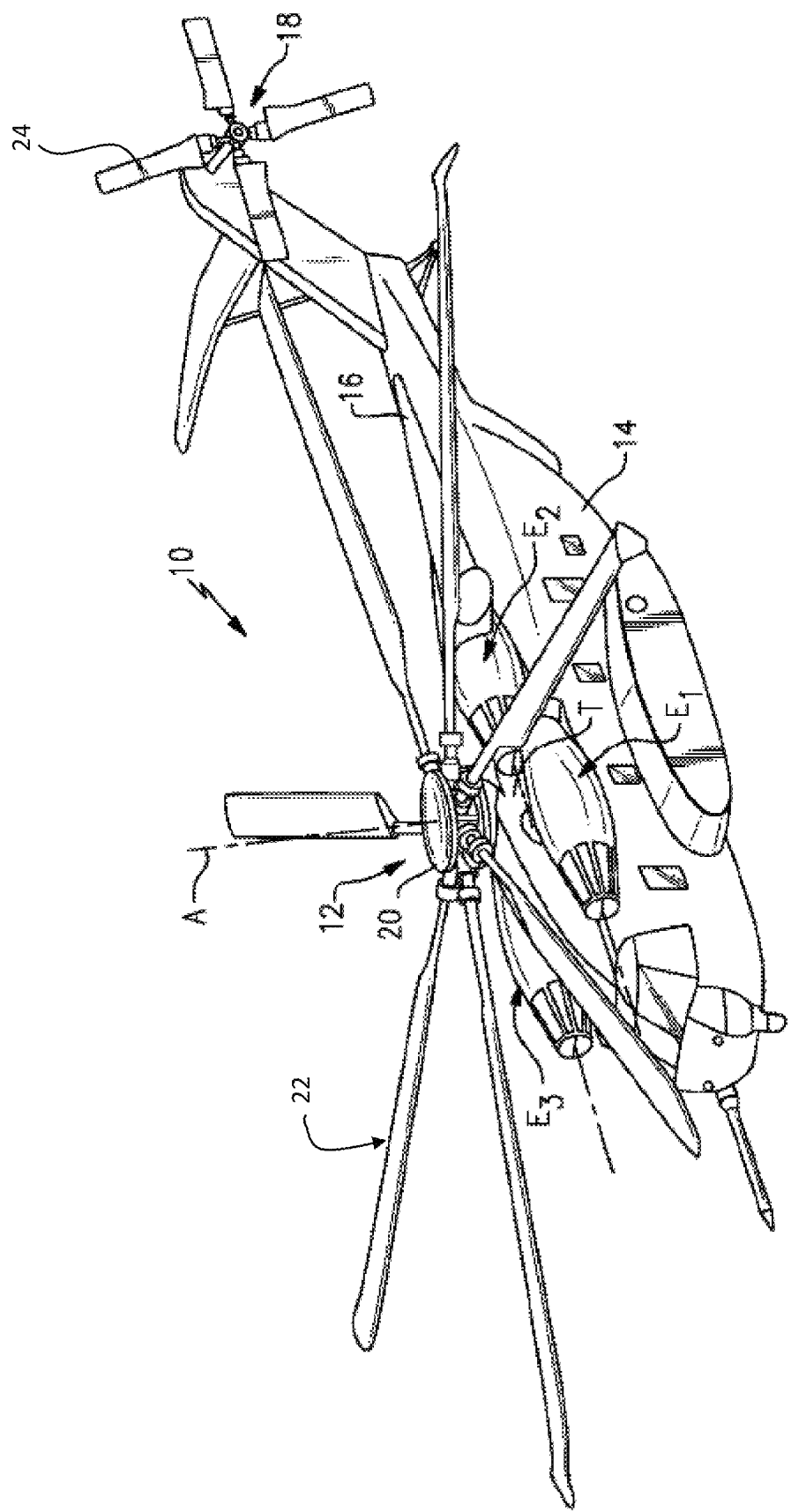
FIG. 1 illustrates a perspective view of an example of a rotary wing aircraft according to aspects of the present disclosure.

The detailed description explains embodiments of the invention, together with advantages and features, by way of example with reference to the drawings.

DETAILED DESCRIPTION OF THE INVENTION

Many existing mission planning techniques utilize map-based software. In these cases, a pilot/operator selects actions to be completed in sequence at specific points on a map. However, this approach can be slow, unnatural, and not easily extensible. In particular, it is difficult to capture all relevant mission parameters and their relationships in a graphical manner while simultaneously enabling a pilot/operator to manipulate the mission in real-time.

The present disclosure provides for natural language mission planning using a man-machine interface. In particular, the present techniques provide for a natural language interface that enables an operator to see and interact with full mission details quickly and concisely. The operator is presented with a mission framework where key details are omitted. For example, a simple flight may contain natural phrases indicating that the operator would like to fly to an airport but no details are provided (e.g., which airport, which runway, which pattern of vectors, etc.). The human operator provides the key mission details by typing, speaking, or selecting options from a menu, resulting in a full mission description that is expressed in natural language. Accordingly, the operator only needed to specify a small set of parameters for the mission. The displayed mission framework may be context-sensitive such that the displayed phrases may be tailored in real-time to enable detailed descriptions of many mission types without overloading the operator with details.

In one example, an operator initiates a new mission plan and is presented with an interface to collect information during mission planning in a natural language form. The natural language form begins to construct a sentence that describes the mission intent. Options to populate fields in the sentence are generated from an autonomous mission manager (AMM). The operator then makes selections for each of the fields. Each of these selections influences the structure and content of the sentence as it builds. When complete mission intent has been conveyed, the AMM creates an optimized mission plan to be reviewed by the operator.

These and other aspects of the present disclosure are described in more detail below.

The present techniques provide a familiar and comfortable mission planning interface that can flexibly adapt to a variety of missions with little to no training required of the pilot/operator. For example, an operator with domain knowledge of the mission can easily manage the mission. The present techniques also provide a flexible framework for representing complex tasks and their interrelationship, which can in turn be extended to larger missions.

Example embodiments of the disclosure include or yield various technical features, technical effects, and/or improvements to technology. For instance, example embodiments of the disclosure provide the technical effect of presenting a user with a natural language interface to enable the user to plan and manage a mission. As a result, operator error is reduced by providing natural language input for the user. The present techniques improve safety and operational efficiency, such as of an aircraft, by simplifying the user interface and by prepopulating fields based on operator inputs. Moreover, the present techniques achieve the technical effect of enabling execution of a mission based on an operator's inputs. As a result of these technical features and technical effects, example embodiments of the disclosure constitute an improvement to existing missions and to vehicles, such as aircraft. It should be appreciated that the above examples of technical features, technical effects, and improvements to technology of example embodiments of the disclosure are merely illustrative and not exhaustive.

FIG. 1 schematically illustrates an example of a rotary wing aircraft 10 having a main rotor assembly 12. The aircraft 10 includes an airframe 14 having an extending tail 16 which mounts a tail rotor system 18, such as an anti-torque system, a translational thrust system, a pusher propeller, a rotor propulsion system, and the like. The main rotor assembly 12 includes a plurality of rotor blade assemblies 22 mounted to a rotor hub 20. The main rotor assembly 12 is driven about an axis of rotation A through a main gearbox (illustrated schematically at T) by one or more engines E. Although a particular helicopter configuration is illustrated and described in the disclosed embodiment, other configurations and/or machines, such as high speed compound rotary wing aircraft with supplemental translational thrust systems, dual contra-rotating, coaxial rotor system aircraft, tilt-rotors and tilt-wing aircraft, and fixed wing aircraft, will also benefit from embodiments of the invention.

Figure 2:
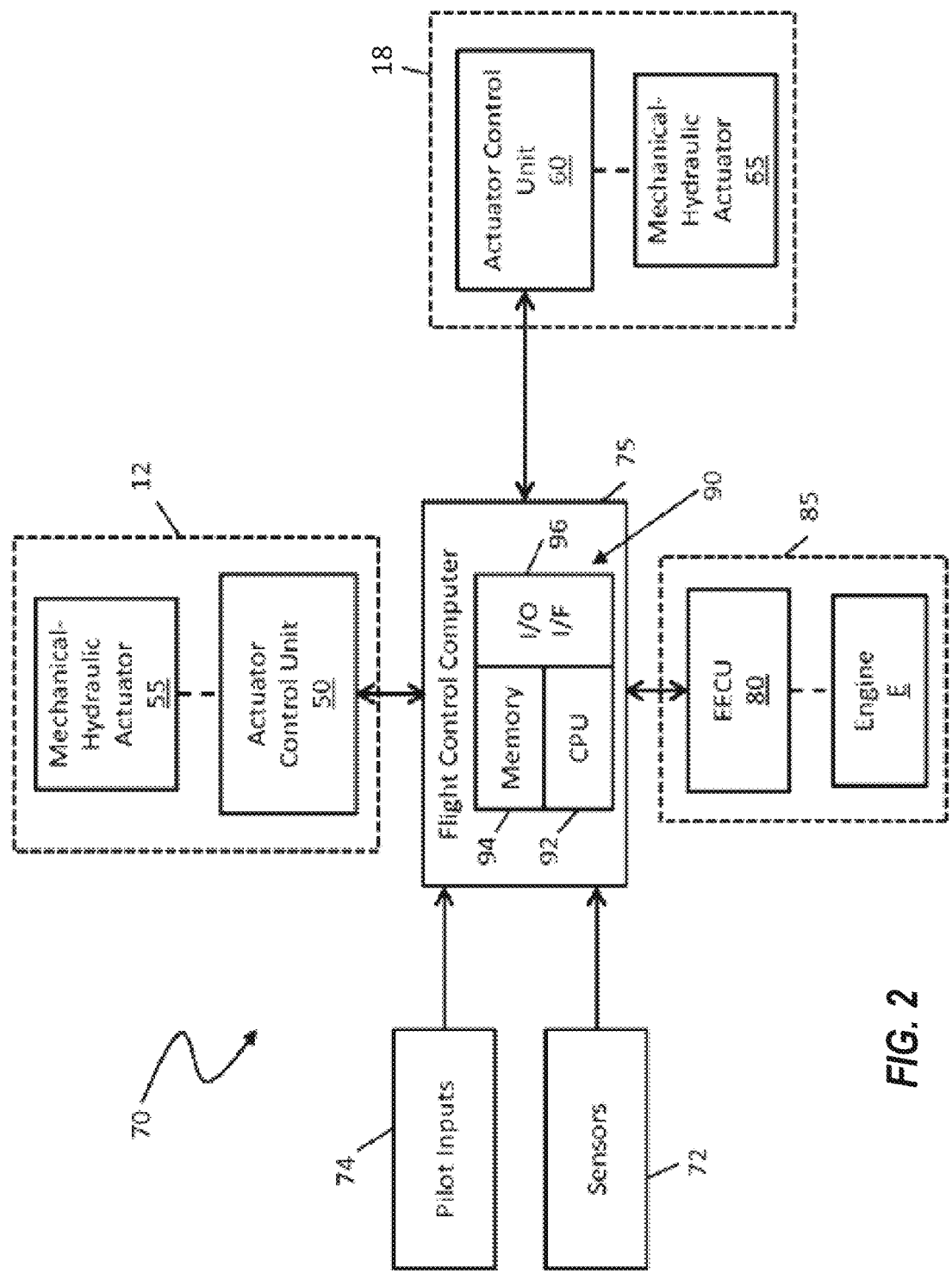
FIG. 2 illustrates a block diagram of a flight control system of an aircraft according to aspects of the present disclosure.

Portions of the aircraft 10, such as the main rotor system 12 and the tail rotor system 18 for example, are driven by a flight control system 70 illustrated in FIG. 2. In one embodiment, the flight control system 70 is a fly-by-wire (FBW) control system. In a FBW control system, there is no direct mechanical coupling between a pilot's controls and movable components or control surfaces, such as rotor blade assemblies 20 or propeller blades 24 for example, of the aircraft 10 of FIG. 1. Instead of using mechanical linkages, a FBW control system includes a plurality of sensors 72 which can sense the position of controlled elements and generate electrical signals proportional to the sensed position. The sensors 72 may also be used directly and indirectly to provide a variety of aircraft state data to a flight control computer (FCC) 75. The FCC 75 may also receive pilot inputs 74 as control commands to control the lift, propulsive thrust, yaw, pitch, and roll forces and moments of the various control surfaces of the aircraft 10.

In response to inputs from the sensors 72 and pilot inputs 74, the FCC 75 transmits signals to various subsystems of the aircraft 10, such as the main rotor system 12 and the tail rotor system 18. The FCC 75 can use reference values in the pilot inputs 74 for feed forward control to quickly respond to changes in the reference values and can perform feedback control to reject disturbances detected via the sensors 72. Pilot inputs 74 can be in the form of stick commands and /or beeper commands to set and incrementally adjust reference values for controllers. The pilot inputs 74 need not be directly provided by a human pilot, but may be driven by an automatic pilot, a remote control, a navigation-based control, or one or more outer control loops configured to produce one or more values used to pilot the aircraft 10.

The main rotor system 12 can include an actuator control unit 50 configured to receive commands from the FCC 75 to control one or more actuators 55, such as a mechanical-hydraulic actuator, for the rotor blade assemblies 20 of FIGS. 1 and 2. In an embodiment, pilot inputs 74 including cyclic and /or collective commands may result in the actuator control unit 50 driving the one or more actuators 55 to adjust a swashplate assembly to control the rotor blade assemblies 20 of FIG. 1. Alternatively, the FCC 75 can directly control the one or more actuators 55, and the actuator control unit 50 can be omitted.

The tail rotor system 18 can include an actuator control unit 60 configured to receive commands from the FCC 75 to control one or more actuators 65, such as a mechanical-hydraulic actuator, associated with one or more propeller blades 24. In an embodiment, pilot inputs 74 include a propeller pitch command for the actuator control unit 60 to drive the one or more actuators 65 for controlling the propeller blades FIG. 1. Alternatively, the FCC 75 can directly control the one or more actuators 65, and the actuator control unit 60 can be omitted.

The FCC 75 can also interface with an engine control system 85 including one or more electronic engine control units (EECUs) 80 to control the engines E. Each EECU 80 may be a digital electronic control unit such as Full Authority Digital Engine Control (FADEC) electronically interconnected to a corresponding engine E. Each engine E may include one or more instances of the EECU 80 to control engine output and performance. Engines E may be commanded in response to the pilot inputs 74, such as a throttle command.

Rather than simply passing pilot inputs 74 through to various control units 50, 60, and 80, the FCC 75 includes a processing system 90 that applies models and control laws to augment commands. The processing system 90 includes processing circuitry 92, memory 94, and an input/output (I/O) interface 96. The processing circuitry 92 can be any type or combination of computer processors, such as a microprocessor, microcontroller, digital signal processor, application specific integrated circuit, programmable logic device, and /or field programmable gate array, and is generally referred to as central processing unit (CPU) 92. The memory 94 can include volatile and non-volatile memory, such as random access memory (RAM), read only memory (ROM), or other electronic, optical, magnetic, or any other computer readable storage medium onto which data and control logic as described herein are stored. Therefore, the memory 94 is a tangible storage medium where instructions executable by the processing circuitry 92 are embodied in a non-transitory form. The I/O interface 96 can include a variety of input interfaces, output interfaces, communication interfaces and support circuitry to acquire data from the sensors 72, pilot inputs 74, and other sources (not depicted) and may communicate with the control units 50, 60, 80, and other subsystems (not depicted).

Figure 3:
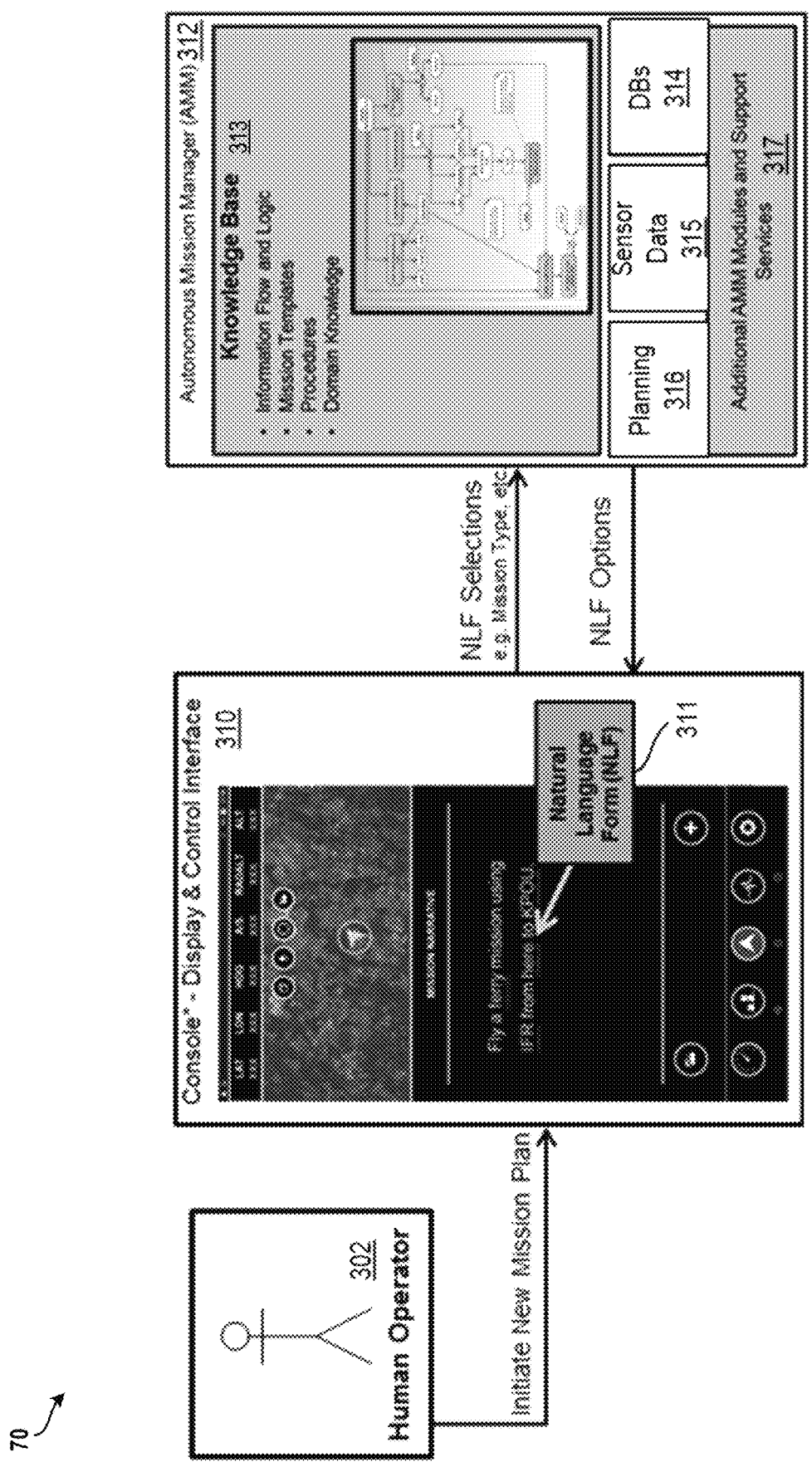
FIG. 3 illustrates a block diagram of a flight control system for natural language mission planning according to aspects of the present disclosure.

Turning now to FIG. 3, the flight control system 70 includes a display 310 to display a natural language form 311 and an autonomy mission manager (AMM) module 312 to populate the natural language form 311.

The display 310 also may receive input from a user or operator (i.e., a mission planner, a pilot, a crew member, etc.). For example, the display 310 may be a touch-sensitive display such that a user may provide input directly to the display 310. In another example, the user may use an input device (e.g., a mouse, a keyboard, a joystick, etc.) to provide input to the display 310. In other examples, the user may interact with the display 310 to modify views and information presented on the display. For example, the user may scroll the display 310, use drop-and-drag to reposition items on the display 310, make selections on the display 310, and the like.

Figure 4:
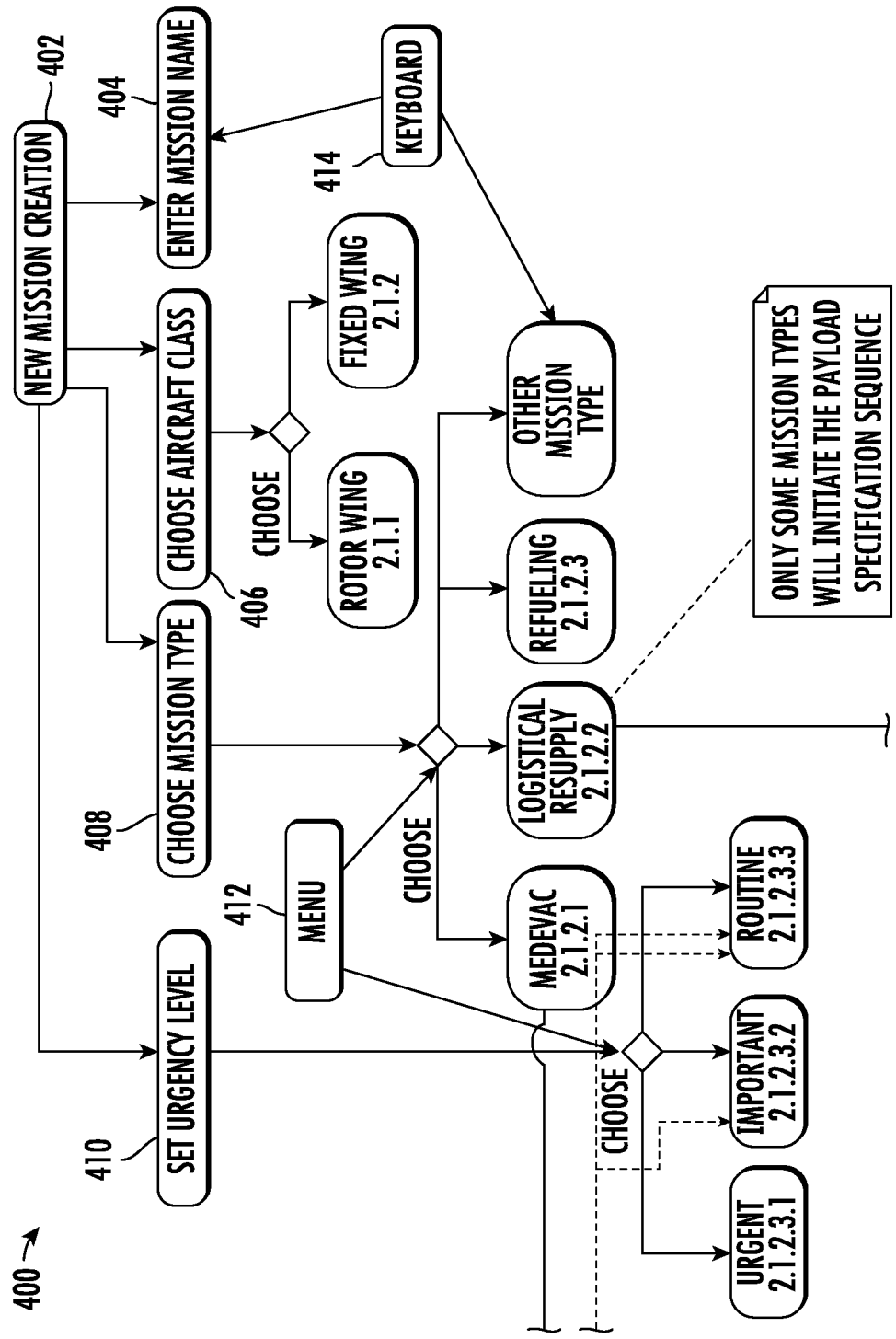
FIG. 4 illustrates a flow diagram of a method for natural language mission planning according to aspects of the present disclosure.

To begin, a human operator 302 initiates a new mission plan as described in FIG. 4 on the display 310. The display 310 displays an interface that includes a natural language form 311. In particular, the natural language form 311 includes a mission narrative in natural language. The mission narrative may also be referred to as a sentence. The mission narrative includes fields that are based on the type of mission selected. For example, as illustrated in FIG. 3 the fields for a flight mission may be a mission type, a set of rules, an origin, and a destination.

The fields in the mission narrative of the natural language form 311 are generated by the AMM 312, which may include a knowledge base 313, databases 314, sensor data 315, a planning module 316, and additional modules 317. The natural language form (NLF) selections (e.g., mission type, etc.) are passed to the AMM 312, and a knowledge base 313 is used to begin populating the NLF options. The knowledge base 313 may include information flow and logic to populate the NLF based on mission templates, procedures, domain knowledge and the like. The databases 314 contain information such as airports, waypoints, terrain, etc., and may be used to populate the NLF options. Likewise, sensor data 315 (e.g., airspeed, altitude, heading, etc.) may be used along with planning services 316 that may include stored flight/mission plans. In some examples, additional AAM modules and support services 317 may be implemented to provide information for NLF options as aircraft specific restrictions.

Once the AMM generates the NLF options, the NLF options are populated into the mission narrative. The NLF options are then presented to the pilot, mission planner, operator, etc., who can select which NLF options to use. In the flight mission example of FIG. 3, the mission narrative is "Fly a ferry mission using instrument flight rules (IFR) from here to KPOU (i.e., Dutchess County Airport)." The underlined portions indicate fields that are selectable. For example, a ferry mission may be selected from different mission types provided by the knowledgebase 313 and/or the planning services 316 of the AMM 312. Other types of missions may include take off, cargo drop, landing, medevac, and others. Similarly, the IFR rules may be selected as flight rules instead of visual flight rules (VFR). The origin and destination fields may be selected from locations populated based on the database 314 (e.g., a list of nearby airports) and/or the sensor data 315 (e.g., current GPS coordinates).

In another example, the mission narrative may be "At KPOU, I want to LAND on RUNWAY 24 enter L BASE." Again, the underlined portions indicate fields that are selectable.

FIG. 4 illustrates a flow diagram of a method 400 for natural language mission planning according to aspects of the present disclosure. A human operator initiates a new mission (block 402) by selecting a mission type (block 408), an urgency level (block 410), an aircraft class (block 406), etc. and entering a mission name (block 404). A menu 412 may be used to display the various options of the method 400 to a mission planner, and a keyboard 414 or other input device (e.g., a touchpad, a touchscreen, a mouse, a microphone, etc.) may be used to receive selections from the mission planner. For example, the mission planner may select an aircraft type of rotor wing or fixed wing. The mission planner may also select a mission type, such as a medevac mission, a logistical resupply mission, a refueling mission, or another mission type (e.g., a payload mission). Other options are also selectable.

Figure 5:
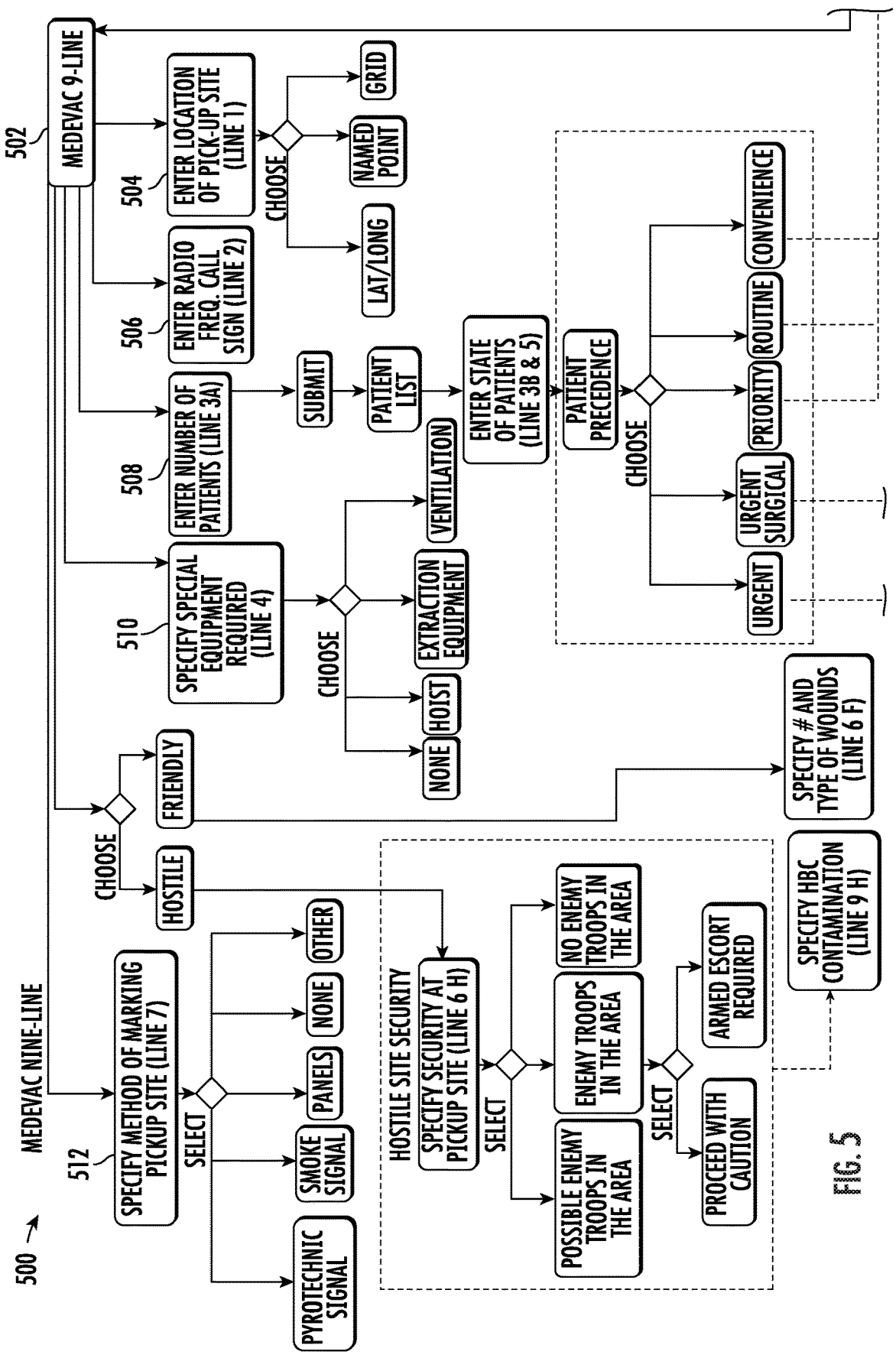
FIG. 5 illustrates a flow diagram of a method for a medevac mission for natural language mission planning according to aspects of the present disclosure.

FIG. 5 illustrates a flow diagram of a method 500 for a medevac mission 502 for natural language mission planning according to aspects of the present disclosure. If a medevac mission 502 is selected at block 408 of FIG. 4, the mission planner may be presented with options for entering a pick-up location (block 504), entering a radio frequency and call sign (block 506), entering a number of patients (block 508), entering special equipment required (block 510), and entering a method for marking the pickup site (block 512). The user may enter or select desired options using a suitable input device. Other options may also be presented to the mission planner, such as whether the pickup area is hostile or friendly and what to do in each situation. Other options, such as patient condition, type of special equipment needed, and details about the pick-up location may also be selected or entered.

Figure 6:
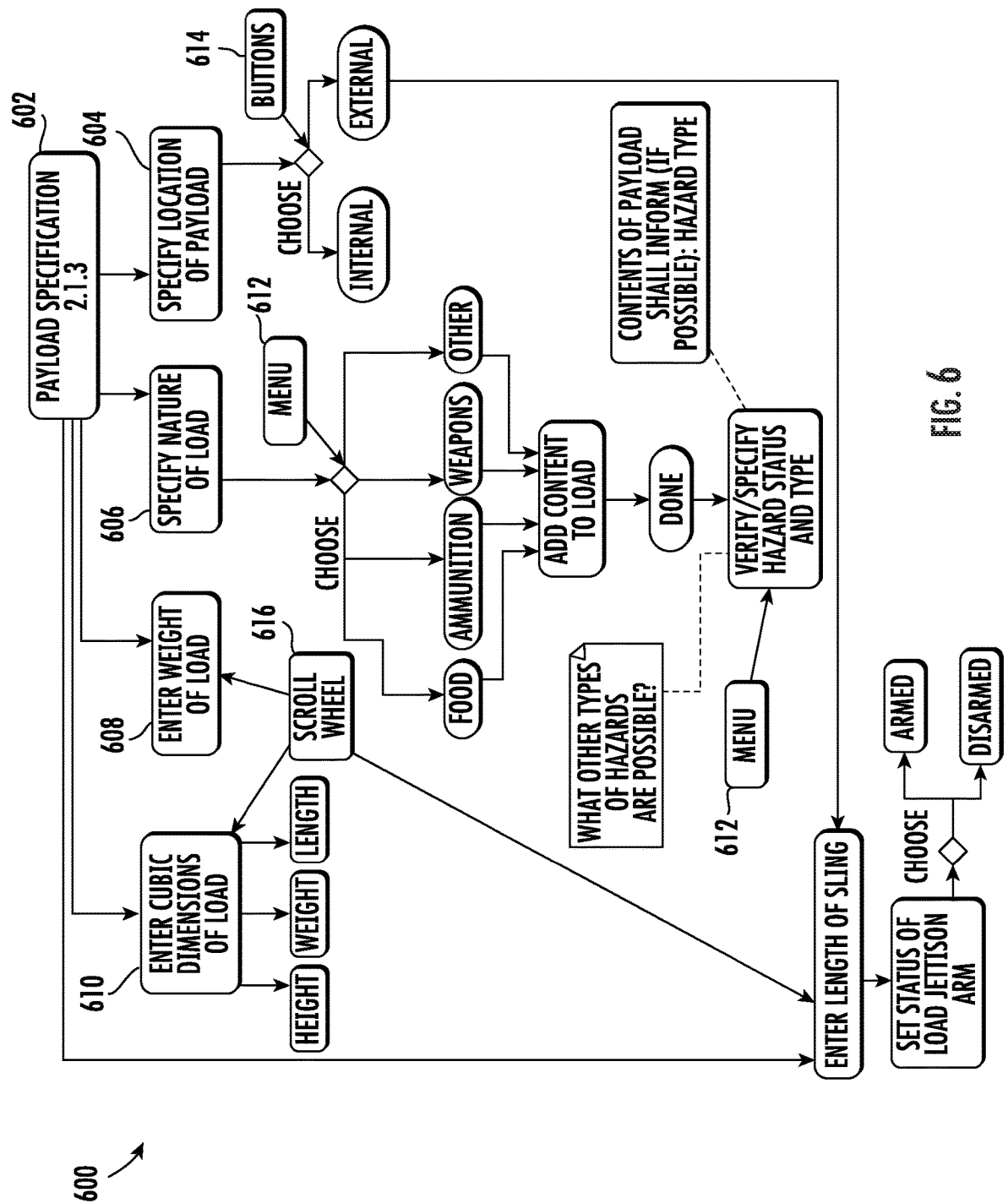
FIG. 6 illustrates a flow diagram of a method for a payload mission for natural language mission planning according to aspects of the present disclosure.

FIG. 6 illustrates a flow diagram of a method 600 for a payload mission 602 for natural language mission planning according to aspects of the present disclosure. If a payload mission is selected at block 408 of FIG. 4, the mission planner may be presented with options for specifying a location of the payload (block 604), specifying a nature of the payload (block 606), entering a weight of the payload (block 608), entering dimensions of the payload (block 610), and the like. The user may be presented with the various options on a menu 612 and may make his selections or entries using suitable inputs such as a scroll wheel 616, buttons 614, a keyboard, a mouse, a microphone, a touch screen, or another suitable input device. The mission planner may select other options as well, for example whether the payload is food, ammunition, weapons, or something else.

Figure 7:
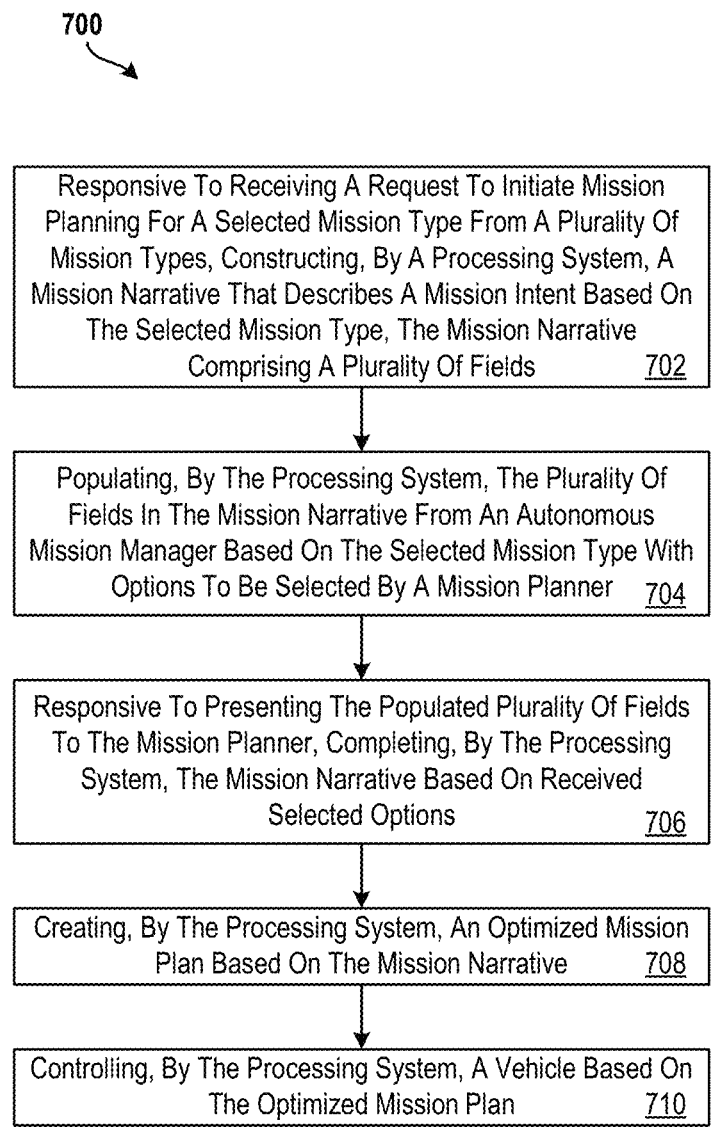
FIG. 7 illustrates a flow diagram of a method for natural language mission planning according to examples of the present disclosure.

FIG. 7 illustrates a flow diagram of a method 700 for natural language mission planning according to examples of the present disclosure. The method 700 may be performed, for example, by the flight control system 70 of FIG. 2 or by another suitable processing device or system.

At block 702, the method 700 includes constructing, by a processing system, a mission narrative that describes a mission intent based on the selected mission type responsive to receiving a request to initiate mission planning for a selected mission type from a plurality of mission types. The mission narrative includes a plurality of fields. For example, the mission planner may indicate that a mission type is to fly a ferry mission as illustrated in FIG. 3.

At block 704, the method 700 includes populating, by the processing system, the plurality of fields in the mission narrative from an autonomous mission manager based on the selected mission type with options to be selected by a mission planner. In the example of a ferry mission, the mission narrative may be populated "Fly a ferry mission using RULES from POINT A to POINT B." The mission planer is then presented with options to be selected for RULES, POINT A (i.e., origin), and POINT B (i.e., destination).

At block 706, the method 700 includes responsive to presenting the populated plurality of fields to the mission planner, completing, by the processing system, the mission narrative based on received selections. When the mission planner selects the options for RULES, POINT A, and POINT B based on the example above, the mission narrative is completed by including the mission planner's selections. If the mission planner selects IFR as RULES, the present location as POINT A, and KUOU as POINT B, the selected options are applied to the mission narrative. In this example, the completed mission narrative is presented to the mission planner as "Fly a ferry mission using instrument flight rules (IFR) from here to KPOU."

At block 708, the method 700 includes creating, by the processing system, an optimized mission plan based on the mission narrative. The mission narrative may be in sentence form. The optimized mission plan provides flight details, such as altitudes, headings, vectors, and the like to enable the flight control computer 70, for example, to execute the mission narrative.

At block 710, the method 700 includes controlling, by the processing system, a vehicle based on the optimized mission plan. That is, the flight control computer 70 can use the optimized mission plan to control the aircraft 10 or another suitable vehicle. For example, controlling the vehicle based on the optimized mission plan may include controlling an altitude, a heading, and/or a speed.

Additional processes also may be included. For example, the method 700 may include presenting the optimized mission plan to the mission planner and receiving an acceptance from the mission planner prior to controlling the vehicle based on the optimized mission plan. In additional examples, the method 700 may include presenting, by the processing system, the optimized mission plan in narrative form to the mission planner on a display. The method 700 may further include receiving a request to edit the optimized mission plan and then controlling the vehicle based on the received request to edit the optimized mission plan.

It should be understood that the processes depicted herein represent illustrations, and that other processes may be added or existing processes may be removed, modified, or rearranged without departing from the scope and spirit of the present disclosure.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A processing system for natural language mission planning, the system comprising:
   processing circuitry; and
   memory coupled to the processing circuitry and comprising instructions that, when executed by the processing circuitry, cause the processing circuitry to perform a method comprising:

receiving a request to initiate mission planning for a selected mission type from a plurality of mission types, wherein the plurality of mission types comprises a medical evacuation mission, a logistical resupply mission, a refueling mission, and a cargo mission, constructing a mission narrative that describes a mission intent based on the selected mission type, the mission narrative comprising a plurality of fields, populating the plurality of fields in the mission narrative based on the selected mission type with options to be selected by a mission planner, filling the mission narrative with the received selected options to create an optimized mission plan responsive to presenting the populated plurality of fields to the mission planner, and controlling a vehicle based on the optimized mission plan.

2. The processing system of claim 1, further comprising an input device configured to receive the selected mission type and the selected options from the mission controller.

3. The processing system of claim 1, further comprising a display to display the mission narrative to the mission planner.

4. The processing system of claim 1, wherein controlling the vehicle based on the optimized mission plan comprises controlling at least one of an altitude, a heading, or a speed.

5. The processing system of claim 1, wherein the mission narrative is in sentence form.

6. The processing system of claim 1, wherein completing the mission narrative further comprises applying the selected options to the mission narrative and presenting the altered mission narrative to the mission planner.

7. The processing system of claim 1, wherein the options are populated based on at least one of sensor data, a mission template, and a mission database.

8. A computer-implemented method for natural language mission planning, the method comprising:

responsive to receiving a request to initiate mission planning for a selected mission type from a plurality of mission types, constructing, by a processing system comprising processing circuitry and memory having instructions executed by the processing circuitry, a mission narrative that describes a mission intent based on the selected mission type, the mission narrative comprising a plurality of fields, wherein the plurality of mission types comprises a medical evacuation mission, a logistical resupply mission, a refueling mission, and a cargo mission;

populating, by the processing system, the plurality of fields in the mission narrative from an autonomous mission manager based on the selected mission type with options to be selected by a mission planner;

responsive to presenting the populated plurality of fields to the mission planner, filling, by the processing system, the mission narrative with the received selected options;

creating, by the processing system, an optimized mission plan based on the mission narrative; and controlling, by the processing system, a vehicle based on the optimized mission plan.

9. The computer-implemented method of claim 8, wherein the mission narrative is in sentence form.

10. The computer-implemented method of claim 8, further comprising presenting the optimized mission plan to the mission planner and receiving an acceptance from the mission planner prior to controlling the vehicle based on the optimized mission plan.

11. The computer-implemented method of claim 8, wherein controlling the vehicle based on the optimized mission plan comprises controlling at least one of an altitude, a heading, or a speed.

12. The computer-implemented method of claim 8, further comprising presenting, by the processing system, the optimized mission plan in narrative form to the mission planner on a display.

13. The computer-implemented method of claim 12, further comprising receiving, by the processing system, a request to edit the optimized mission plan.

14. The computer-implemented method of claim 13, further comprising controlling, by the processing system, the vehicle based on the received request to edit the optimized mission plan.

\* \* \* \* \*